(12) United States Patent
Wei Lee et al.

(10) Patent No.: US 11,701,903 B2
(45) Date of Patent: Jul. 18, 2023

(54) PRINTER

(71) Applicant: TOSHIBA TEC KABUSHIKI KAISHA, Tokyo (JP)

(72) Inventors: Kok Wei Lee, Singapore (SG); Kenji Eoka, Singapore (SG); Ting Yee Chin, Singapore (SG); Jia Juin Chan, Singapore (SG)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/724,823

(22) Filed: Apr. 20, 2022

(65) Prior Publication Data

US 2023/0001716 A1 Jan. 5, 2023

(30) Foreign Application Priority Data

Jul. 1, 2021 (JP) ................. 2021-109824

(51) Int. Cl.
*B41J 13/10* (2006.01)
*H04N 1/00* (2006.01)

(52) U.S. Cl.
CPC .......... *B41J 13/10* (2013.01); *H04N 1/00408* (2013.01); *H04N 1/00543* (2013.01); *H04N 1/00557* (2013.01); *H04N 1/00559* (2013.01)

(58) Field of Classification Search
CPC ............... B65H 2408/13; B65H 20/02; B65H 2220/01; B65H 2220/02; B65H 35/04; B65H 20/30; B65H 2220/11; B65H 2301/121; B65H 2301/51212; B65H 2301/543; B65H 2404/1441; B65H 2511/22; B65H 2513/512; B65H 2601/325; B65H 2701/1311; B65H 2801/12;

(Continued)

(56) References Cited

U.S. PATENT DOCUMENTS 4,825,245 A * 4/1989 Fukae ................. G06K 15/16
355/24
5,779,379 A 7/1998 Mason
(Continued)

FOREIGN PATENT DOCUMENTS

| JP | H11245476 A | 9/1999 |
|---|---|---|
| JP | 2001180863 A | 7/2001 |
| JP | 2016078970 A | 5/2016 |

OTHER PUBLICATIONS

Extended European Search Report dated Dec. 9, 2022, mailed in counterpart European Application No. 22178336.8, 5 pages.

*Primary Examiner* — Negussie Worku
(74) *Attorney, Agent, or Firm* — Kim & Stewart LLP (57) ABSTRACT

A printer has a lower module and upper module. The lower module has a paper feed unit and a printing unit. A back of the upper module is hinged to lower module. A paper handling part holds paper after printing by the printing unit. A discharge unit in the upper module moves the paper out of the upper module while maintaining a hold on a rear portion of the paper and to draw the paper back into the upper module after an elapse of time. A container includes a support member that rotates into contact with and moves away from a lower part of the upper module. The container configured to receive and store the paper that has been drawn back by the discharge unit. The paper is stored in a region between the support member and the lower part of the upper module.

19 Claims, 11 Drawing Sheets

(58) Field of Classification Search
CPC ...... B65H 29/008; B65H 35/06; B65H 20/40;
B65H 2220/09; B65H 2301/33312; B65H
2402/43; B65H 2402/443; B65H
2403/5321; B65H 2404/1442; B65H
2404/7414; B65H 2511/518; B65H
2513/41; B65H 2553/412; B65H 26/00;
B65H 2601/255; B65H 2601/26; B65H
2701/1313; B65H 2701/1912; B65H
2701/1936; B65H 2801/03; B65H 29/14;
B65H 35/006; B65H 43/00; B65H 29/38;
B65H 31/20; B65H 31/30; B65H 5/02;
G03G 21/1623; G03G 21/1647; G06K
15/403; G06K 15/4085; G06K 15/028
USPC .......................................................... 358/1.1
See application file for complete search history.

(56) References Cited

U.S. PATENT DOCUMENTS

| | | | | |
|---|---|---|---|---|
| 9,141,075 B2* | 9/2015 | Choi | .................. | G03G 21/1609 |
| 2002/0044305 A1* | 4/2002 | Kawai | ................ | H04N 1/00538 |
| | | | | 358/474 |
| 2003/0184806 A1* | 10/2003 | Nara | ................... | H04N 1/0035 |
| | | | | 358/1.18 |
| 2005/0214038 A1* | 9/2005 | Hirai | .................. | G03G 15/0194 |
| | | | | 399/302 |

* cited by examiner

PRINTER

CROSS-REFERENCE TO RELATED APPLICATION

This application is based upon and claims the benefit of priority from Japanese Patent Application No. 2021-109824, filed Jul. 1, 2021, the entire contents of which are incorporated herein by reference.

FIELD

Embodiments described herein relate generally to a printer.

BACKGROUND

According to the related art, a terminal device such as an ATM (automatic teller machine) or a kiosk terminal installed in a section of a store for accepting bank account transaction procedures or the like often has a built-in printer used to output a bank statement (such as a slip of paper where details of a bank account transaction record or the like are recorded).

In such a printer, after a predetermined time has passed without the outputted paper being taken out of the discharge port, the previously discharged paper can be drawn back into the printer to prevent problems related to another person not concerned in the banking transaction taking the bank statement inadvertently or on purpose. The paper drawn back into the printer is discharged from the back of the printer and kept inside the kiosk terminal. Such stored paper must be periodically removed. However, the removal work is troublesome since the paper is usually kept in a place that is hard or otherwise inconvenient to reach.

The printer may have a structure that is divided into two sections (an upper and a lower section) that can be opened/separated to give access to the inside. As an example of such a structure, an upper module laid on top of a lower module can be lifted up at its front side about a hinge or fulcrum at the back side of the modules. The printer with such a structure typically has a configuration to prohibit (lock) the open-close module movements during operation.

To perform maintenance on the printer, such as coping with a paper jam, an operator carries out an operation of cancelling the lock to allow opening of the printer. However, the part that accepts or permits this unlocking operation may be provided at the back of the printer which may be difficult for an operator standing at the front of the printer to access. Such a printer requires a space to be left or otherwise provided on a side of the printer so the operator can reach a hand around to the back of the printer from the front.

However, with terminal devices such as an ATM or a kiosk terminal, the total lateral dimensions are typically designed to be as narrow as possible for reasons such as minimization of the installation area. Therefore, such terminal devices tend to have little extra empty space left inside or around the terminal device. Therefore, it is difficult to provide a space on the side of built-in terminal printer where the operator can insert a hand

DETAILED DESCRIPTION

An embodiment described herein is to facilitate collection of printer paper that is discharged once but then drawn back into the printer for disposal or the like.

Figure 1:
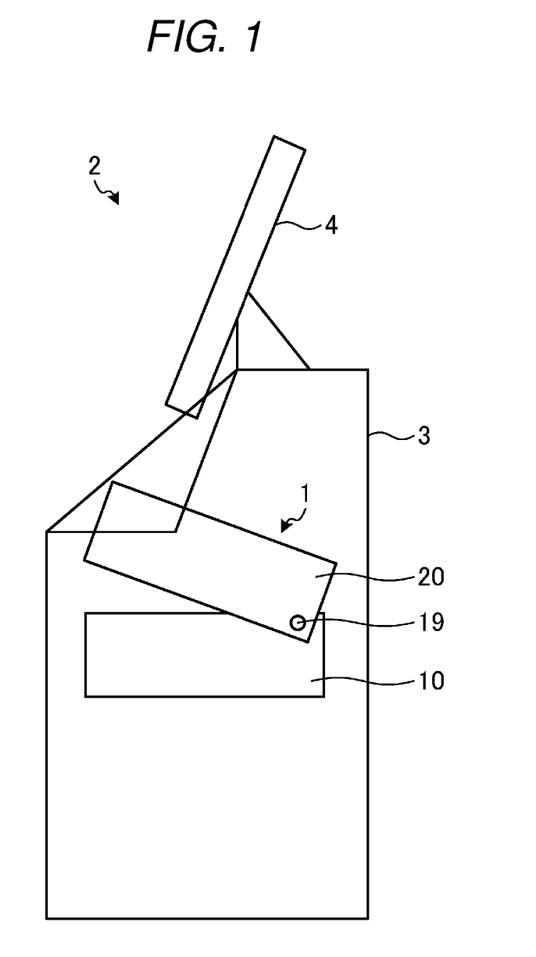
FIG. 1 schematically shows the configuration of a kiosk terminal having a built-in printer according to an embodiment.

In general, according to one embodiment, a printer includes a lower module including a paper feed unit and a printing unit that is configured to print on paper fed by the paper feed unit. An upper module of the printer is above the lower module. A back side of the upper module is supported by the lower module to permit rotational movement of a front side of the upper module upwards and downwards to come into contact with and move away from the lower module. A paper handling part is in the upper module and configured to hold the paper after printing by the printing unit. A discharge unit is provided in the upper module configured to move the paper from the paper handling part out of the upper module while keeping a hold on a rear portion of the paper to allow the paper to be drawn paper back into the upper module after an elapse of a predetermined time. A container is provided in the printer including a support member. A back side of the support member is supported to permit rotational movement of a front side of the support member upwards and downwards to come into contact with and move away from a lower part of the upper module. The container is configured to receive and store the paper drawn back into the printer by the discharge unit. The container permits printed paper(s) to be stored in a region between the support member and the lower part of the upper module An example embodiment will now be described using the drawings. FIG. 1 schematically shows the configuration of a kiosk terminal 2 having a built-in printer 1 according to the embodiment. In FIG. 1, the position where the operator of the kiosk terminal 2 stands is on the left side in the illustration. That is, the left side in the illustration corresponds to a position at the front of the kiosk terminal 2. The kiosk terminal 2 shown in FIG. 1 is being viewed from the righthand side of the kiosk terminal 2.

In this embodiment, the printer 1 is built into the kiosk terminal 2. However, in other examples, printer 1 may be built in to an ATM or any other device that may utilize or require a printer function.

The kiosk terminal 2 has an operation display unit 4 on top of a vertically long box-like main body unit 3 (also referred to as a housing or a case). The operation display unit 4 is configured to accept an input operation corresponding to a display content. For example, the operation display unit 4 comprises a touch panel superimposed on the surface of a display device such as a liquid crystal panel. The main body unit 3 has the printer 1 and other peripheral devices/units such as a card reader-writer as built-in components.

The left side in the illustration is the position where the operator of the kiosk terminal 2 stands. The operation display unit 4 displays information toward the position where the operator stands. The printer 1 dispenses a printed object (e.g., a slip of paper) toward the position where the operator stands. The sides and back of such a kiosk terminal 2 are not necessarily open or accessible, except for the position where the operator stands. Therefore, the kiosk terminal 2 is configured in such a way that an operation and maintenance or the like can be performed from its front side (that is, the left side in the illustration).

Figure 2:
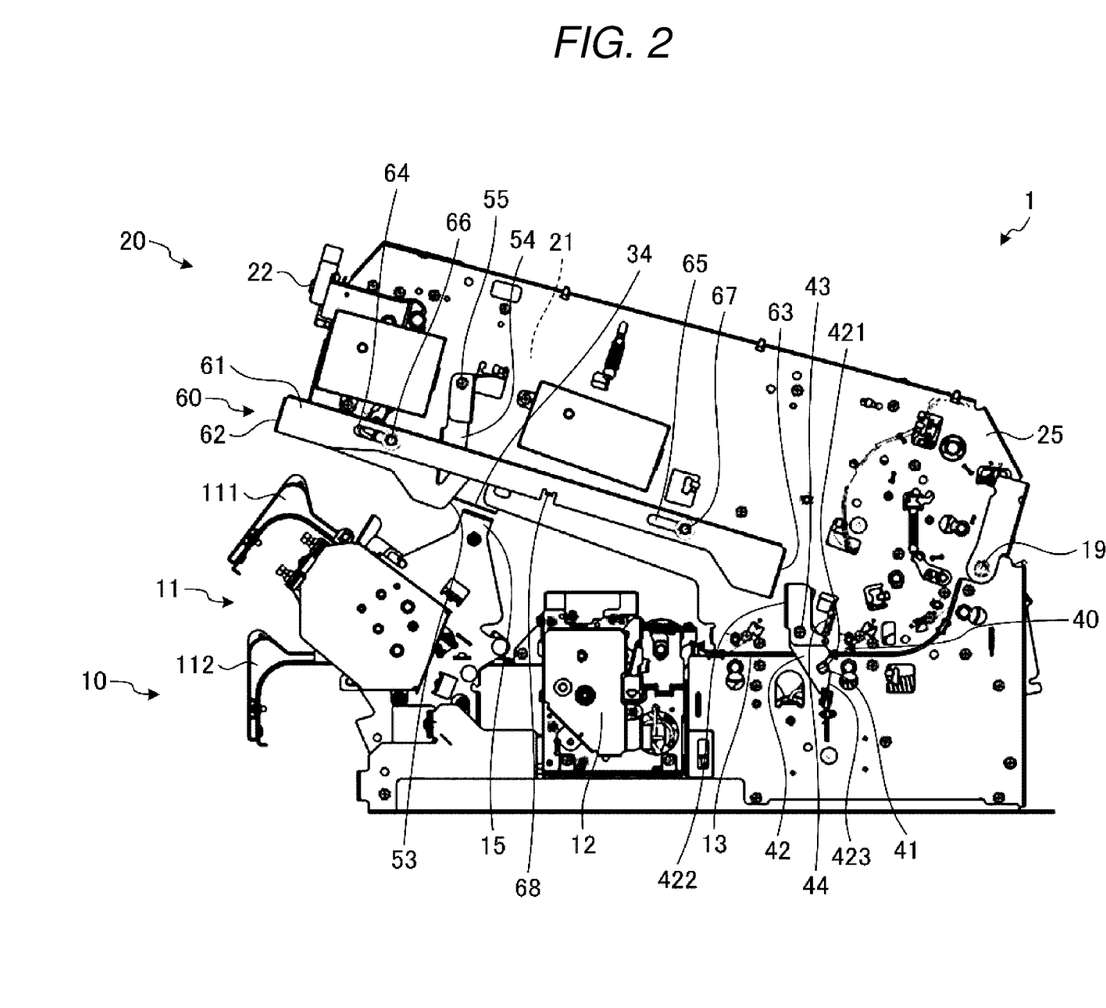
FIG. 2 shows an example of the structure of a printer.
Figure 3:
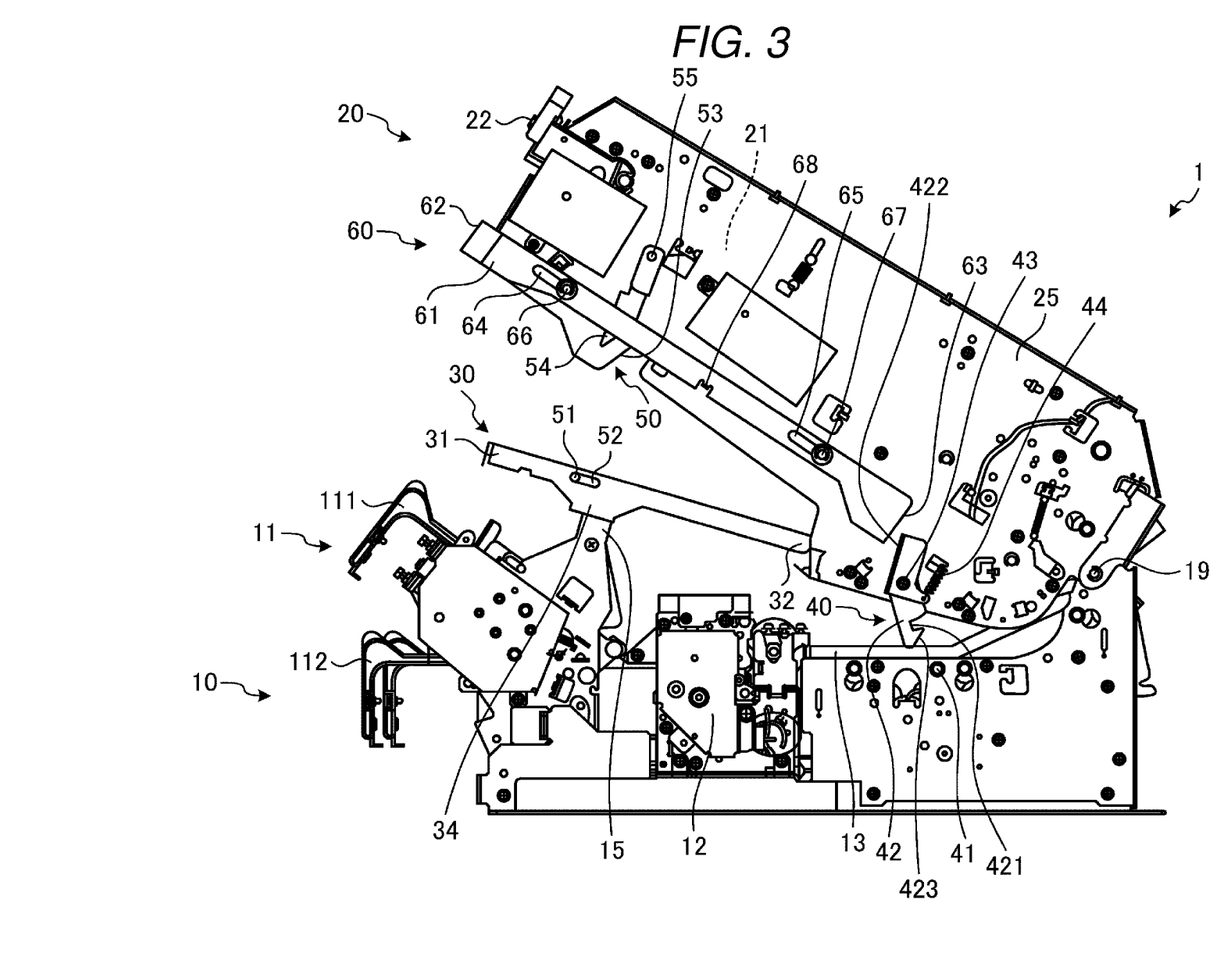
FIG. 3 shows an example of the structure of a printer.
Figure 4:
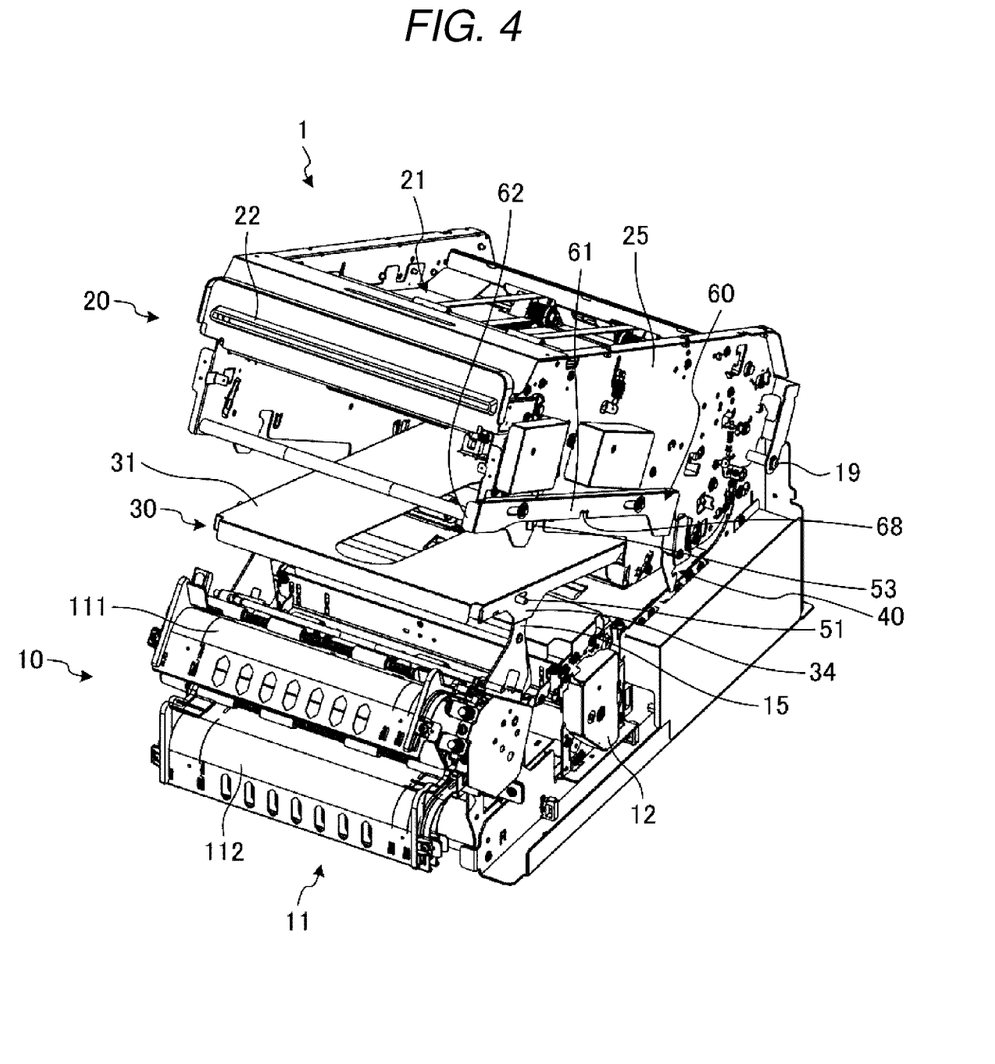
FIG. 4 is a perspective view showing a printer in an open state.

The structure of the printer 1 will now be described, using FIGS. 2 to 11. FIGS. 2 and 3 show an example of the structure of the printer 1. FIG. 2 shows printer 1 in an operating state. FIG. 3 shows the printer 1 in an open state. FIG. 4 is a perspective view corresponding to FIG. 3 and thus also shows the printer 1 in the open state.

In FIGS. 2 and 3, the left side in the illustration is the front side (forward side) of the printer 1. Therefore, the left-right direction in the illustration is the depth direction (front-back direction) of the printer 1. The depth direction (direction into the page) in the illustration (direction orthogonal to the sheet surface) is the width (left-right direction) of the printer 1. The up-down direction in the illustration is the height direction of the printer 1. FIG. 4 shows the printer 1 as viewed from a front oblique direction.

The printer 1 has a lower module 10, an upper module 20, a container unit 30, a first lock part 40, a second lock part 50 (see FIG. 3), and an interlock part 60.

In the lower module 10, a paper feed unit 11, a printing unit 12, and a conveyor unit 13 are provided. In the upper module 20, a loading part 21 and a discharge unit 22 are provided.

The printer 1 has a shaft 19 that extends along the width direction (left-right direction) at the back side of the upper module 20 and the lower module 10. The shaft 19 attaches the upper module 20 in a rotationally movable manner to the lower module 10. Thus, the upper module 20 is located on top of the lower module 10 and supported at its back side in a rotationally movable manner to the lower module 10. The upper module 20 thus comes into contact with and moves away from the lower module 10 with the rotational movement. Near the shaft 19, an urging member (e.g., a spring mechanism or the like) pressing the upper module 20 in the direction of lifting up the upper module 20 can be provided. The urging member is, for example, a torsion spring or the like provided around the shaft 19.

The paper feed unit 11 has two different paper feed paths (111, 112) and feeds a paper taken in from either of the paper feed paths (111, 112) to the printing unit 12. The paper feed unit 11 feeds paper to the printing unit 12 via the first paper feed path 111, and when paper runs out, performs a back-feed via the paper feed path 111 to draw back the paper from the printing unit 12 and then feeds paper via the second paper feed path 112. The paper is a fan-folded paper, for example. The folded part of the fan-folded paper is contained inside a lower part of the vertically long box-like main body unit 3 or the like.

The printing unit 12 has a print head and a platen and prints on a paper held between the print head and the platen. A cutter for cutting the printed paper into a predetermined length is provided downstream of the printing unit 12. The conveyor unit 13 has a substantially U-shaped conveyance path extending from the lower module 10 to the upper module 20 and conveys the printed and cut paper to the loading part 21.

The loading part 21 (also referred to as a paper handling part) is provided in the upper module 20 and holds the paper that has been printed by the printing unit 12 after the printing has been completed. More specifically, in this example, the loading part 21 aligns together a plurality of papers (e.g., tickets, coupons or the like) that have been printed and then cut into a predetermined length, and forms a paper bundle or stack.

The discharge unit 22 is provided in the upper module 20 and moves (discharges) the paper bundle out of the upper module 20, while pinching (gripping) a rear part of the paper bundle. The discharge unit 22 is also capable of drawing the paper bundle back into the upper module 20 after the lapsing of a predetermined time. Thus, if the discharged paper bundle is not retrieved by a user/customer within some expected time, the discharge unit 22 returns the paper bundle to the interior of the printer 1.

Figure 5:
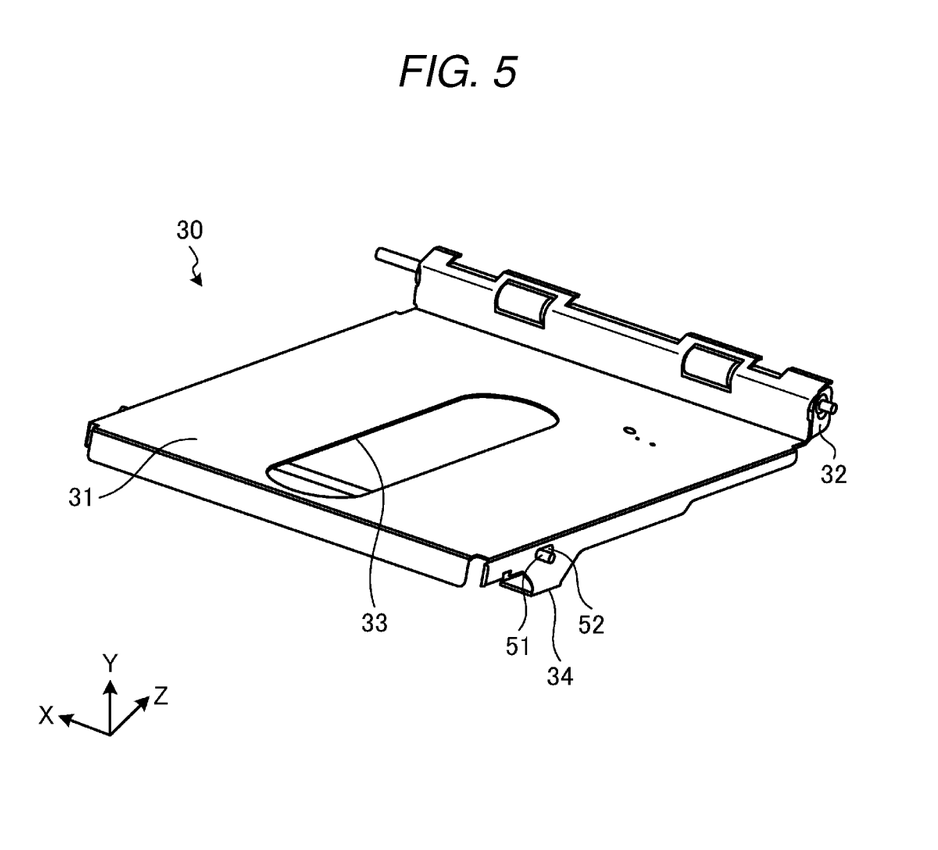
FIG. 5 shows an example of the external appearance of a member forming a container unit.

FIG. 5 shows an example of the external appearance of a member forming the container unit 30. The container unit 30 has a tray 31, which is a plate-like member, as a support member for supporting paper. The tray 31 is supported at its end part 32 on the back side in a rotationally movable manner to a lower part of the upper module 20, as shown in FIG. 3, and comes into contact with and moves away from the upper module 20 with the rotational movement. The container unit 30 is fixed at a position near the upper module 20 by the second lock part 50, when the upper module 20 is at a position near the lower module 10 and the printer 1 is in the operating state.

Figure 6:
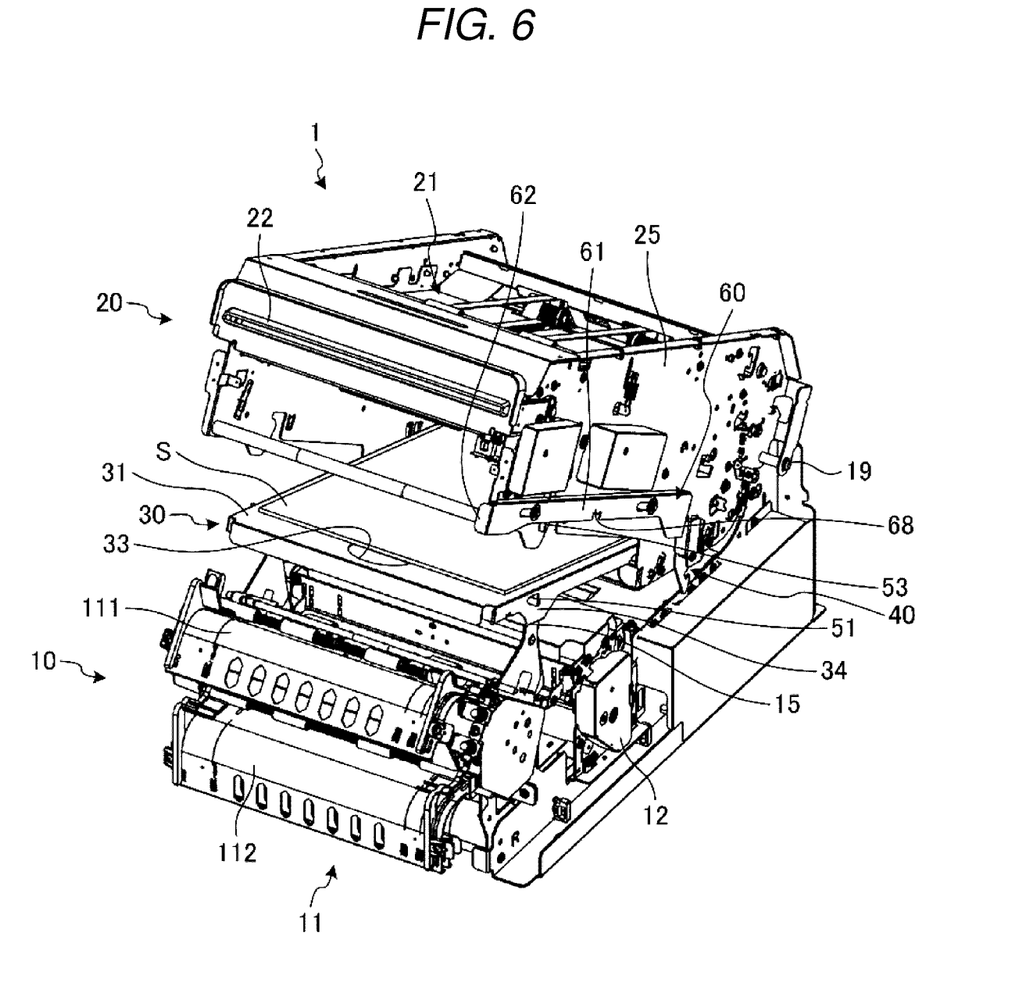
FIG. 6 is a perspective view showing a state where a paper is placed on a tray.

On the tray 31, the paper that has been drawn back by the discharge unit 22 is stored. The container unit 30 holds the paper between the tray 31 and the upper module 20. FIG. 6 is a perspective view showing a paper S on the tray 31. At a middle part of the tray 31 in the width direction, a hole 33 that makes it easier to grasp the paper S remove the paper S is formed.

The first lock part 40 will now be described, referring to FIGS. 2, 3, and 7. The first lock part 40 fixes the upper module 20 at a position near the lower module 10 in a rotationally unmovable manner. When the fixation (lock) by the first lock part 40 is cancelled (disengaged), the upper module 20 moves in the direction away from the lower module 10 due to an urging force of the urging member provided near the shaft 19.

The urging member may provide at least a force large enough to avoid unintended relocking by the first lock part 40 due to a downward movement of the upper module 20 under its own weight. The urging member need not provide a force that is large enough to flip up the upper module 20 to the state shown in FIG. 3 on its own. Preferably, the upper module 20 is lifted up to such an extent that the operator can recognize the cancellation (disengagement) of the lock has occurred.

A specific example of the configuration of the first lock part 40 will now be described. The first lock part 40 includes a stud 41, which is an example of a first fixture, a first lever 42, a shaft 43, and an urging member 44. The urging member 44 is a tension spring, for example. The stud 41 is provided in the lower module 10. The shaft 43 and the first lever 42 are provided in the upper module 20.

The first lever 42 is attached in a rotationally movable manner to a side plate 25 of the upper module 20 by the shaft 43 along the width direction (left-right direction) of the printer 1. With the rotational movement, the first lever 42 is movable between a holding position for holding the stud 41 (see FIG. 2) and a release position for releasing the stud 41 that has been held (see FIG. 7). FIG. 7 shows the state where the first lever 42 is at the release position.

The urging member 44 urges the first lever 42 in a direction going from the release position to the holding position (counterclockwise in the illustration). When the external force that places the first lever 42 at the release position against the force provide by the urging member 44 is no longer applied, the first lever 42 automatically returns to the holding position.

The first lever 42 has a groove 421 and a pressed part 422. The groove 421 has a width that is enough for the stud 41 to enter and exit. When the upper module 20 is at a position near the lower module 10, the groove 421 catches and holds the stud 41.

The pressed part 422 is a part receiving a pressing force from a link lever 61 and is located on the opposite side of the groove 421 from the shaft 43. As the pressed part 422 is pressed, the first lever 42 rotationally moves in a direction such that the stud 41 exits the groove 421.

The first lever 42 has at its distal end a guide slope 423 (sloped portion) for guiding the stud 41 to the groove 421. The guide slope 423 is provided to slide on the stud 41 and thus facilitate the rotational movement of the first lever 42 when the upper module 20 moves downward from its position away from the lower module 10 to its position near the lower module 10.

The interlock part 60 will now be described, referring to FIGS. 7 and 8. FIG. 8 shows an example of the structure of the printer and shows the state where the link lever 61 is removed from FIG. 2. The interlock part 60 has the link lever 61, studs 66, 67, and an urging member 69 (see FIG. 8). The urging member 69 is a tension spring, for example.

The link lever 61 is provided in the upper module 20 with its longitudinal direction laid in the depth direction of the upper module 20 and has a handle 62 protruding to the front side of the upper module 20 and a pressing part 63 at the back side. The pressing part 63 is provided at a position facing the pressed part 422 of the first lever 42.

Two slots 64, 65 are formed in the link lever 61. The slots 64, 65 are provided, spaced apart from each other in the longitudinal direction of the link lever 61. The longitudinal direction of the slots 64, 65 is laid along the longitudinal direction of the link lever 61.

The studs 66, 67 are attached, spaced apart from each other in the front-back direction of the upper module 20 and are slidably fitted in the slots 64, 65, respectively. Thus, the link lever 61 is slidable in the front-back direction of the upper module 20.

A cutout part 68 is formed between the slot 64 and the slot 65 in the link lever 61. One end of the urging member 69 is attached to the cutout part 68. The other end of the urging member 69 is attached to the upper module 20. The urging member 69 connects the cutout part 68 (formed in the link lever 61) and the upper module 20. Thus, the link lever 61 is urged toward the front side of the upper module 20.

Figure 7:
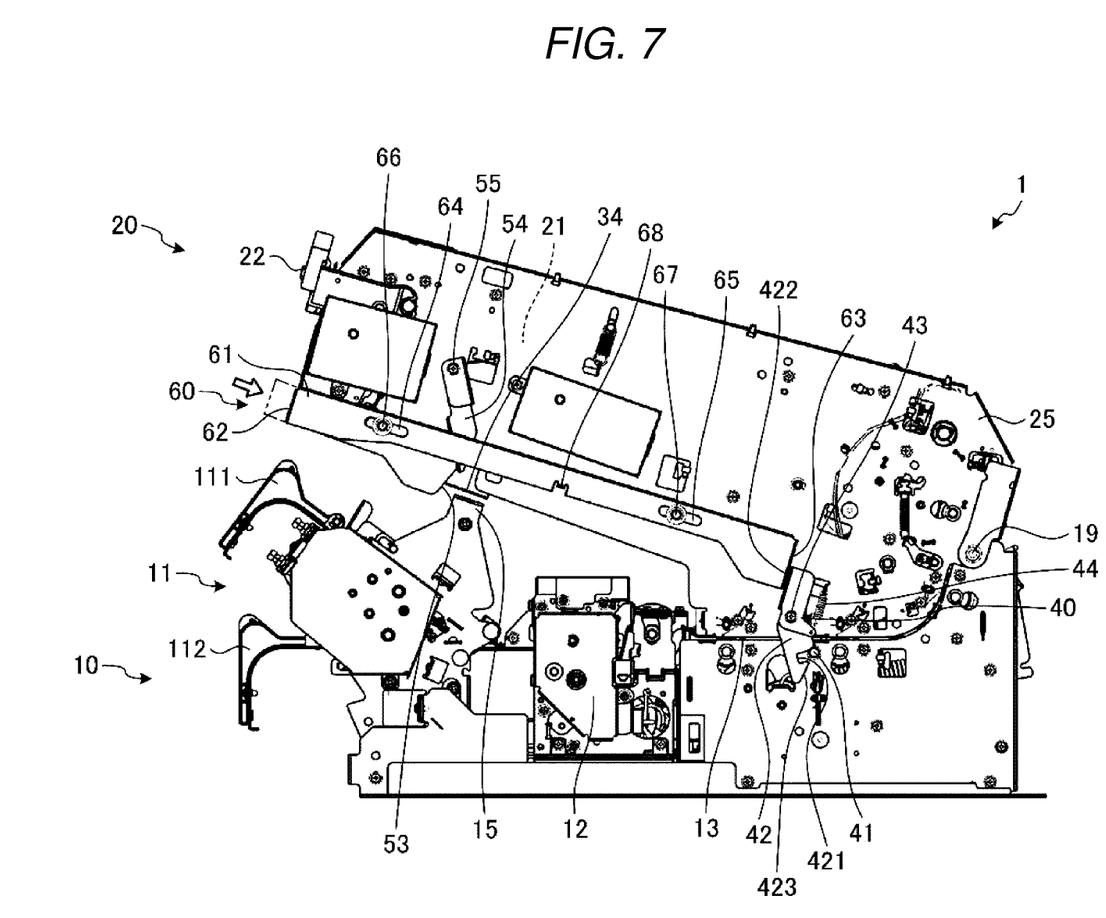
FIG. 7 shows a state where a first lever is at a release position.
Figure 8:
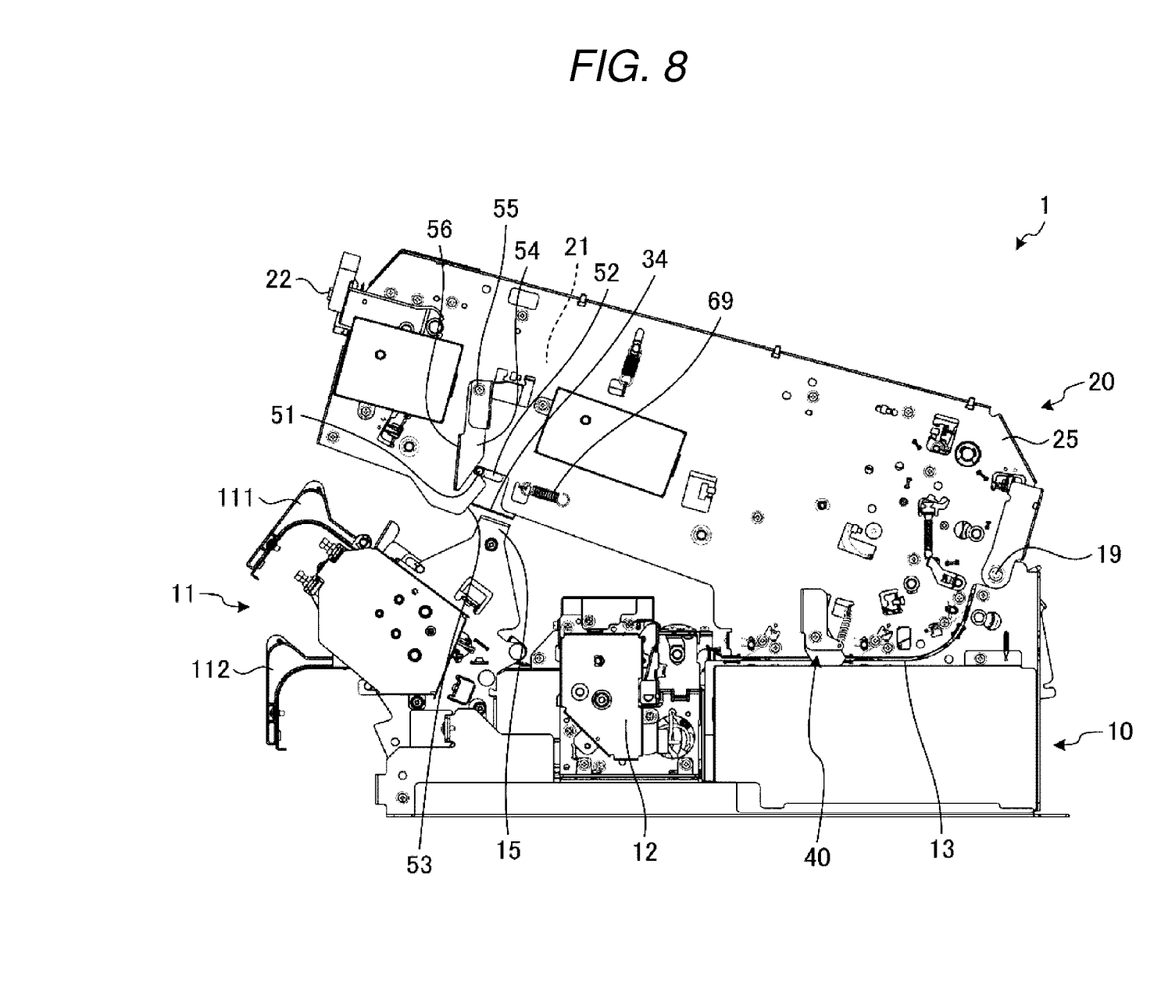
FIG. 8 shows an example of the structure of a printer.

In this way, the link lever 61 can reciprocate between the front side and the back side of the printer 1 and acts on the first lock part 40 and the second lock part 50 when moving to the back side in the direction indicated by an arrow in FIG. 7. That is, the link lever 61 moves the first lever 42 to the release position and also moves a second lever 54 to a release position.

The action of the link lever 61 on the first lever 42 will now be described more in detail. If the handle 62 of the link lever 61 is pushed in when the upper module 20 is near the lower module 10, the pressing part 63 in moving to the back side of the upper module 20 presses the pressed part 422. Thus, the first lever 42 rotationally moves. The stud 41 exits the groove 421 and the stud 41 is thus released. The upper module 20 is lifted up due to the force provided by the urging member near the shaft 19.

Figure 9:
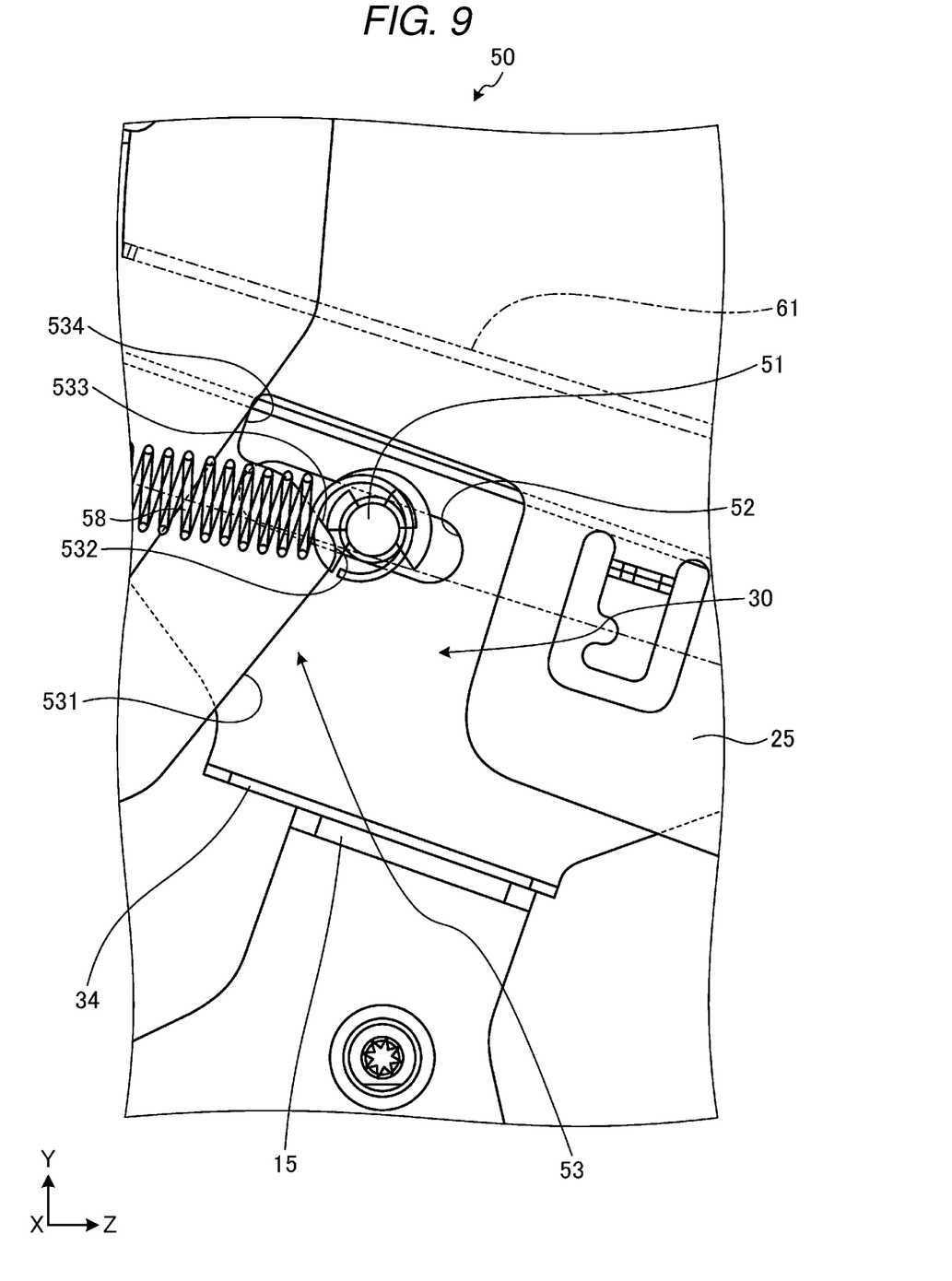
FIG. 9 shows a second lock part in an enlarged manner.

The second lock part 50 will now be described, referring to FIGS. 3 and 8 to 11. As shown in FIGS. 3 and 8, the second lock part 50 is formed by a slide pin 51, a guide part 52, a cutout part 53, the second lever 54, a shaft 55, and an urging member 58 (see FIG. 9). The urging member 58 is a tension spring, for example. FIG. 9 shows the second lock part 50 in an enlarged manner.

The lower module 10 has a support part 15 supporting the lower surface of the tray 31 spaced apart from the upper module 20. On the lower surface of the tray 31, a supported part 34 facing the support part 15 is provided in a protruding state.

The guide part 52 is configured to guide the slide pin 51 movably within a predetermined range along the depth direction of the tray 31. The guide part 52 is, for example, a slot formed in a lateral part of the tray 31 and having its longitudinal direction laid in the depth direction of the tray 31. The slide pin 51 is an example of a second fixture. The slide pin 51 slides within the guide part 52 and thus can reciprocate between the front side and the back side in the depth direction of the tray 31.

The urging member 58 urges the slide pin 51 toward one end of its movement range, that is, causes the slide pin 51 to move to one side of the guide part 52. In this embodiment, the urging member 58 presses the slide pin 51 toward the front side of the printer 1 (the left side in the illustration).

Figure 10:
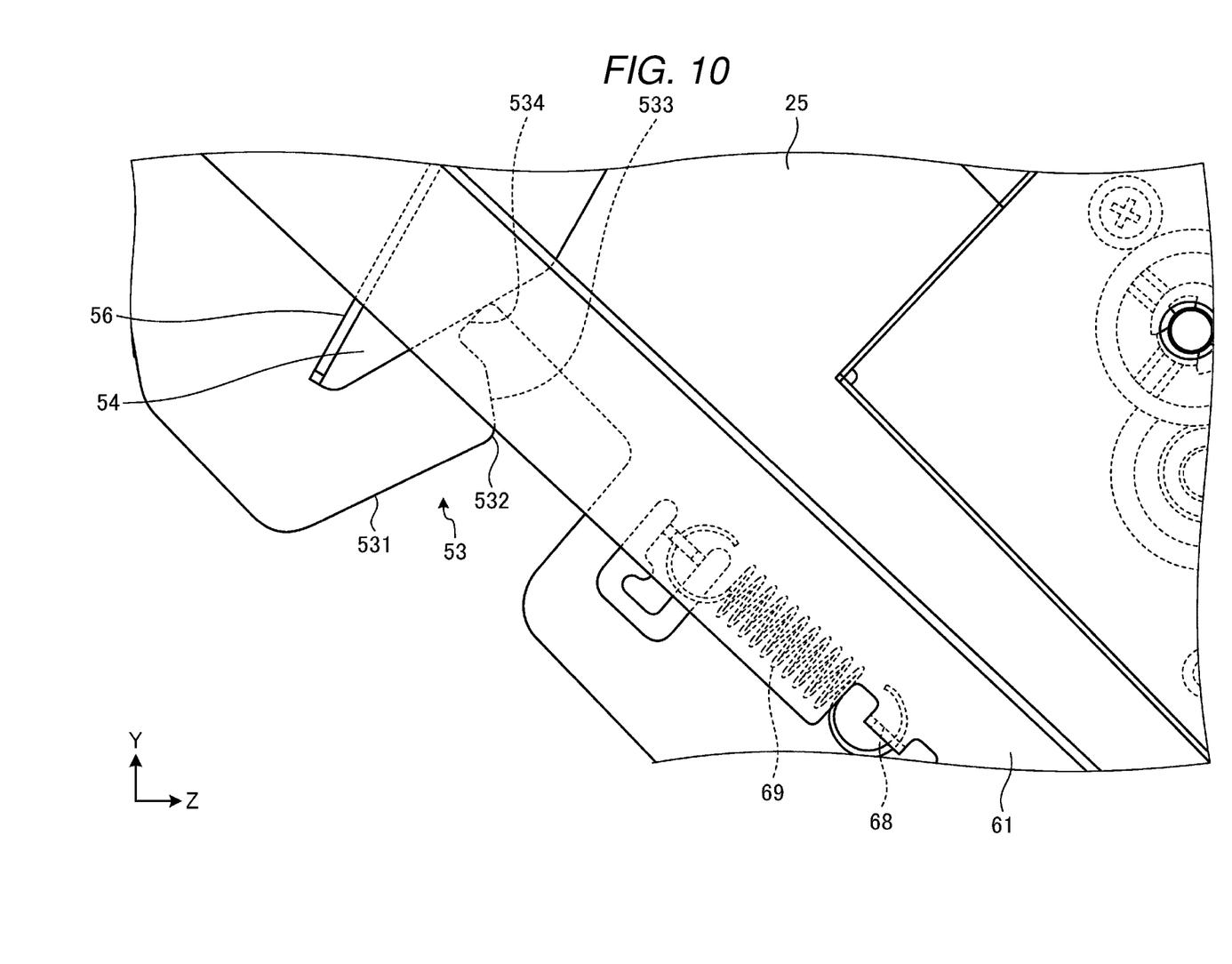
FIG. 10 shows a cutout part in an enlarged manner.

FIG. 10 shows the cutout part 53 in an enlarged manner. The cutout part 53 is provided at a lower end part of the side plate 25 of the upper module 20. The cutout part 53 is an example of a holding part and can hold the slide pin 51.

The cutout part 53 has four sections: a slope part 531 (first sloped portion), a bend part 532 (bent portion), a slope part 533 (second sloped portion), and a terminal end part 534 (end portion) at an edge near the front side of the printer 1. The slope part 531 faces obliquely downward to the back of the printer 1. The slope part 533 faces obliquely upward to the back of the printer 1. The bend part 532 couples (joins) the slope part 531 and the slope part 533 together. The bend part 532 is, for example, a rounded corner portion or the like.

The slope part 531 moves the slide pin 51 of the tray 31 supported by the support part 15 against the force provided by the urging member 58 in the course of the movement of the upper module 20 toward the lower module 10 from the open state of the printer 1.

The slide pin 51 moves by sliding on the slope part 531. After passing the bend part 532, the slide pin 51 moves by sliding on the slope part 533 according to the force provided by the urging member 58 and then reaches the terminal end part 534. When the slide pin 51 is in the terminal end part 534, the lock by the second lock part 50 is applied (engaged). The container unit 30 is fixed at a position near the upper module 20.

The slope part 533 converts the force received from the slide pin 51 moving according to the urging by the urging member 58 into a force that moves the tray 31 toward the upper module 20. Thus, the tray 31 is lifted up and the supported part 34 on the lower surface of the tray 31 moves away from the support part 15, thus forming a gap between the supported part 34 and the support part 15. Also, since the container unit 30 and the lower module 10 consequently do not interfere with each other, the upper module 20 can be pushed a little further down. As the upper module 20 is slightly pushed down after the gap is formed between the supported part 34 and the support part 15, the lock by the first lock part 40 is applied. In this way, the slope part 533 is formed in such a position and shape as to guide the slide pin 51 before the upper module 20 is fixed by the first lock part 40.

Figure 11:
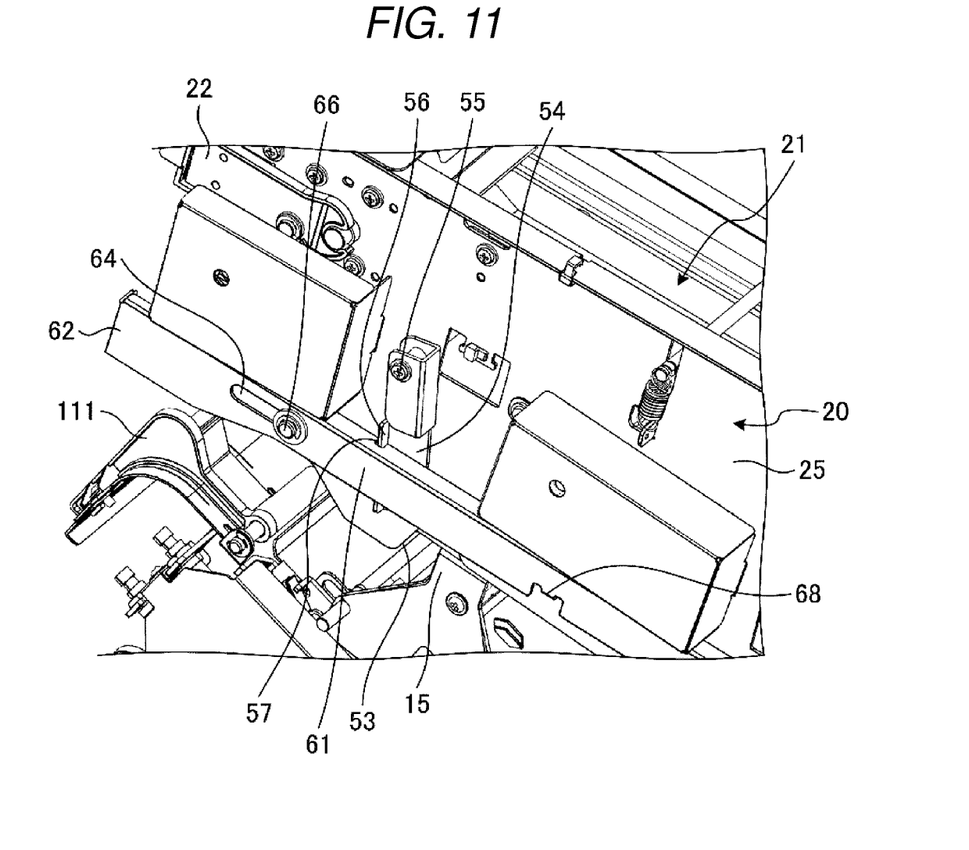
FIG. 11 explains the relationship between an interlock part and a second lock part.

The second lever 54 will now be described. As shown in FIG. 8, the second lever 54 is attached in a rotationally movable manner to the side plate 25 of the upper module 20 by the shaft 55 along the width direction (left-right direction) of the printer 1. With the rotational movement, the second lever 54 is movable between a position that does not interfere with the slide pin 51 and a release position for releasing the slide pin 51 held by the cutout part 53. The second lever 54 rotationally moves by having a force transmitted thereto from the interlock part 60. FIG. 11 explains the relationship between the interlock part 60 and the second lock part 50.

The link lever 61 of the interlock part 60 is located, overlapping the second lever 54 of the second lock part 50 from outside in the width direction of the printer 1. The second lever 54 has a protrusion 56 that is long in the up-down direction of the printer 1. The protrusion 56 protrudes outward in the width direction of the printer 1, that is, toward the link lever 61. In the link lever 61, a recess 57 in which the protrusion 56 is slidably fitted is formed. The link lever 61 and the second lever 54 intersect each other at the position where the protrusion 56 is fitted in the recess 57.

In such a structure, when the link lever 61 moves in the depth direction of the printer 1, the recess 57 moves in the depth direction, too. Therefore, the protrusion 56 fitted in the recess 57 moves in the depth direction, too. During this movement, the protrusion 56 slides on the recess 57. Thus, the second lever 54 rotationally moves about the shaft 55 in response to a force in the direction of the depth. Then, the second lever 54 interferes with the slide pin 51 and moves the slide pin 51 against the force provided by the urging member 58. Also, at this time, the lock on the upper module 20 by the first lock part 40 is cancelled and the upper module 20 is urged in the opening direction. Therefore, the slide pin 51 moves from the terminal end part 534, passes the slope part 533, goes beyond the bend part 532, and exits the cutout part 53. Thus, the lock by the second lock part 50 is cancelled and the container unit 30 can be opened.

When opening the printer 1 to perform maintenance or the like, the operator first holds the handle 62 of the link lever 61 and pushes the link lever 61 in the direction from the front towards the back of the printer 1.

As the link lever 61 is pushed in from the front, the pressing part 63 of the link lever 61 presses the pressed part 422 of the first lever 42. Then, the first lever 42 rotationally moves clockwise in FIG. 2. The stud 41 held in the groove 421 is thus released. Then, the upper module 20 rotationally moves about the shaft 19 and is lifted up due to the urging by the urging member. Thus, the operator can recognize that the lock by the first lock part 40 is now cancelled (disengaged). Having recognized that the lock by the first lock part 40 is cancelled, the operator may then lift up the upper module 20. Thus, with this operator lifting action the upper module 20 rotationally moves further about the shaft 19.

As the link lever 61 is pushed in from the front, the recess 57 of the link lever 61 moves the protrusion 56 of the second lever 54 with the movement of the link lever 61. Thus, the second lever 54 rotationally moves and the lock by the second lock part 50 is cancelled (disengaged). The container unit 30 is thus opened or openable.

When opening the printer 1 for the purpose of coping with a paper jam or the like, the operator generally needs to do nothing with the container unit 30 and therefore may simply manually push up the tray 31 from below to close the container unit 30 and fix the container unit 30 by the second lock part 50. Subsequently, the operator copes with a paper jam or the like.

A case where the operator having finished maintenance or the like returns the upper module 20 to the position near the lower module 10 will now be described. The operator first pushes down the upper module 20 against the force provided by the urging member about the shaft 19. Thus, the upper module 20 moves downward while rotationally moving about the shaft 19. Accordingly, the guide slope 423 (sloped portion) at the distal end of the first lever 42 slides on the stud 41, and with this sliding, the first lever 42 rotationally moves against the force provided by the urging member 44. Once the guide slope 423 passes the stud 41, the stud 41 is fitted in the groove 421 and held therein. Thus, the upper module 20 reaches its completely closed position and the printer 1 becomes operable again.

When the container unit 30 is opened in the above operation, the slide pin 51 in second lock part 50 enters the cutout part 53 and thus becomes locked when the upper module 20 moves down while rotating about the shaft 19.

In this way, in the printer 1 according to this embodiment, operating the link lever 61 enables operation of both the first lock part 40 and the second lock part 50 provided at the back side of the printer 1. Therefore, a single operation of pushing in the link lever 61 can cancel (disengage) the fixation of the upper module 20 to the lower module 10 (making the upper module 20 rotationally movable for opening), cancel (disengage) the fixation of the container unit 30 to the upper module 20, and open the container unit 30.

Also, opening and closing the upper module 20 and the lower module 10 can be performed without reaching around to the back side of the printer 1 from a side of the printer 1 or the like.

Also, the container unit 30 containing the paper drawn back by the discharge unit 22 is provided but the operation for opening the printer 1 remains similar to those in the related art even though the container unit 30 is now added to the printer 1. Therefore, the container unit 30 can be used without impairing expected operability.

Moreover, in existing examples, the paper kept inside the kiosk terminal 2 generally needs to be collected from the back side of the printer 1, whereas, in this embodiment, the paper drawn back by the discharge unit 22 is contained in the container unit 30 and therefore the paper can be collected from the front side of the printer 1 and this makes the collection easier.

While some embodiments have been described, these embodiments are presented simply as examples and are not intended to limit the scope of the present disclosure. These novel embodiments can be carried out in various other forms and can include various omissions, replacements, and modifications without departing from the spirit and scope of the present disclosure. These embodiments and the modifications thereof are included in the spirit and scope of the present disclosure and also included in the scope of the claims and equivalents thereof.

What is claimed is:
1. A printer, comprising:
 a lower module including a paper feed unit and a printing unit configured to print on paper fed by the paper feed unit;

an upper module above the lower module, a back side of the upper module being supported by the lower module to permit rotational movement of a front side of the upper module upwards and downwards to come into contact with and move away from the lower module;

a paper handling part in the upper module configured to hold paper after printing by the printing unit;

a discharge unit in the upper module configured to move the paper from the paper handling part out of the upper module while maintaining a hold on a rear portion of the paper and to draw the paper back into the upper module after an elapse of a predetermined time; and a container including a support member, a back side of the support member being supported to permit rotational movement of a front side of the support member upwards and downwards to come into contact with and move away from a lower part of the upper module, the container configured to receive and store the paper drawn back by the discharge unit in a region between the support member and the lower part of the upper module.

2. The printer according to claim 1, further comprising:

a first lock part configured to fix the upper module at a position near the lower module, the first lock part including:
 a first fixture provided in the lower module, and
 a first lever provided in the upper module, the first lever being movable between a holding position for engaging the first fixture and a release position for releasing the first fixture;

a second lock part configured to fix the container at a position near the upper module and including:
 a second fixture provided in the container unit, the second fixture being able to reciprocate between a front side position and a back side position,
 a holding part provided in the upper module for engaging the second fixture, and
 a second lever that is movable between a first position that does not interfere with movement of the second fixture and a release position for releasing the second fixture from the holding part; and an interlock part provided in the upper module, the interlock part being able to reciprocate between a front side position and a back side position and move the first lever to the release position and the second lever to the release position when moved to the back side position.

3. The printer according to claim 2, wherein the lower module comprises a support part configured to support a lower surface of the container.

4. The printer according to claim 3, wherein the container is spaced apart from the upper module.

5. The printer according to claim 3, further comprising:
an urging part configured to press the second fixture towards one of the front side position or the back side position of the second fixture.

6. The printer according to claim 5, wherein the holding part comprises a bent guide surface with a first slope region for causing the second fixture to move against the pressing force of the urging part when the upper module moves toward the container and a second slope region for guiding the second fixture towards the upper module with the urging force of the urging part before the upper module is fixed by the first lock part.

7. The printer according to claim 5, wherein the urging part is a spring.

8. The printer according to claim 1, wherein the paper handling part is configured to form a bundle of printed papers.

9. The printer according to claim 8, wherein the paper is moved out of the upper module by the discharge unit as a bundle.

10. A kiosk terminal, comprising:

a housing;

a display screen for displaying information to a user that is facing the kiosk terminal from a first direction, the display screen mounted on or in the housing; and a printer in the housing and configured to dispense a printed item to the user, the printer including:
 a lower module including a paper feed unit and a printing unit configured to print on paper fed by the paper feed unit;
 an upper module above the lower module, a back side of the upper module being supported by the lower module to permit rotational movement of a front side of the upper module upwards and downwards to come into contact with and move away from the lower module;
 a paper handling part in the upper module configured to hold paper after printing by the printing unit;
 a discharge unit in the upper module configured to move the paper from the paper handling part out of the upper module while maintaining a hold on a rear portion of the paper and to draw the paper back into the upper module after an elapse of a predetermined time; and
 a container including a support member, a back side of the support member being supported to permit rotational movement of a front side of the support member upwards and downwards to come into contact with and move away from a lower part of the upper module, the container configured to receive and store the paper drawn back by the discharge unit in a region between the support member and the lower part of the upper module.

11. The kiosk terminal according to claim 10, the printer further comprising:

a first lock part configured to fix the upper module at a position near the lower module, the first lock part including:
 a first fixture provided in the lower module, and
 a first lever provided in the upper module, the first lever being movable between a holding position for engaging the first fixture and a release position for releasing the first fixture;

a second lock part configured to fix the container at a position near the upper module and including:
 a second fixture provided in the container unit, the second fixture being able to reciprocate between a front side position and a back side position,
 a holding part provided in the upper module for engaging the second fixture, and
 a second lever that is movable between a first position that does not interfere with movement of the second fixture and a release position for releasing the second fixture from the holding part; and an interlock part provided in the upper module, the interlock part being able to reciprocate between a front side position and a back side position and move the first lever to the release position and the second lever to the release position when moved to the back side position.

12. The kiosk terminal according to claim 11, wherein the lower module comprises a support part configured to support a lower surface of the container.

13. The kiosk terminal according to claim 12, wherein the container is spaced apart from the upper module.

14. The kiosk terminal according to claim 12, the printer further comprising:
   an urging part configured to press the second fixture towards one of the front side position or the back side position of the second fixture.

15. The kiosk terminal according to claim 14, wherein the holding part comprises a bent guide surface with a first slope region for causing the second fixture to move against the pressing force of the urging part when the upper module moves toward the container and a second slope region for guiding the second fixture towards the upper module with the urging force of the urging part before the upper module is fixed by the first lock part.

16. The kiosk terminal according to claim 14, wherein the urging part is a spring.

17. The kiosk terminal according to claim 10, wherein the paper handling part is configured to form a bundle of printed papers.

18. The kiosk terminal according to claim 17, wherein the paper is moved out of the upper module by the discharge unit as a bundle.

19. The kiosk terminal according to claim 10, wherein the housing is openable only from the first direction.

* * * * *